United States Patent
Wen et al.

(10) Patent No.: US 11,003,281 B2
(45) Date of Patent: May 11, 2021

(54) NOISE DETECTION CIRCUIT, NOISE DETECTION METHOD AND DETECTION CIRCUIT

(71) Applicant: SHENZHEN GOODIX TECHNOLOGY CO., LTD., Guangdong (CN)

(72) Inventors: Ya-Nan Wen, Guangdong (CN); Yingsi Liang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 23 days.

(21) Appl. No.: 16/533,760

(22) Filed: Aug. 6, 2019

(65) Prior Publication Data
US 2019/0384477 A1    Dec. 19, 2019

Related U.S. Application Data

(63) Continuation of application No. PCT/CN2018/091146, filed on Jun. 13, 2018.

(51) Int. Cl.
G06F 3/041 (2006.01)
G06F 3/044 (2006.01)
G06F 3/0481 (2013.01)

(52) U.S. Cl.
CPC .......... *G06F 3/04182* (2019.05); *G06F 3/044* (2013.01); *G06F 3/0412* (2013.01); *G06F 3/0481* (2013.01)

(58) Field of Classification Search
CPC ................................. G06F 3/041; G06F 3/044
See application file for complete search history.

(56) References Cited

U.S. PATENT DOCUMENTS 9,991,848 B1    6/2018  Francese
2011/0063993 A1*  3/2011  Wilson .................. G06F 1/3262
                                                        370/254
(Continued)

FOREIGN PATENT DOCUMENTS

CN    102707298 A    10/2012
CN    104731424 A    6/2015
(Continued)

OTHER PUBLICATIONS https://wiki.analog.com/resources/eval/user-guides/ad-fmcomms2-ebz/iq_rotation#rotating_iq (Year: 2016).*
(Continued)

*Primary Examiner* — Chanh D Nguyen
*Assistant Examiner* — Nguyen H Truong
(74) *Attorney, Agent, or Firm* — WPAT, P.C., Intellectual Property Attorneys; Anthony King

(57) ABSTRACT

The present application provides a noise detection circuit, including: a mixing module, configured to perform a mixing operation based on a plurality of frequencies to an integrated signal, to generate a plurality of in-phase signals and a plurality of quadrature signals; a computing module, wherein when the touch control system uses the first frequency to perform the touch control, the computing module performs a signal cancellation operation to a first in-phase signal and a first quadrature signal to calculate and output a first output signal corresponding to the first frequency; and a determination module, configured to select a best output signal from the plurality of output signals and output a best frequency.

19 Claims, 10 Drawing Sheets

(56) References Cited

U.S. PATENT DOCUMENTS

| | | | |
|---|---|---|---|
| 2013/0176272 A1 | 7/2013 | Cattivelli et al. | |
| 2016/0092026 A1 | 3/2016 | Stevenson et al. | |
| 2016/0170516 A1* | 6/2016 | Crandall | G06F 3/04162 345/174 |
| 2016/0364078 A1 | 12/2016 | Krah et al. | |
| 2017/0139536 A1* | 5/2017 | Chen | G06F 3/04166 |
| 2017/0262092 A1 | 9/2017 | Wu | |
| 2019/0042032 A1* | 2/2019 | Moseley | G06F 3/046 |

FOREIGN PATENT DOCUMENTS

| | | | |
|---|---|---|---|
| CN | 105573568 A | 5/2016 | |
| CN | 106775141 A | 5/2017 | |

OTHER PUBLICATIONS

English Abstract Translation of Foreign Document No. CN102707298A.
English Abstract Translation of Foreign Document No. CN104731424A.
English Abstract Translation of Foreign Document No. CN105573568A.
English Abstract Translation of Foreign Document No. CN106775141A.

* cited by examiner

NOISE DETECTION CIRCUIT, NOISE DETECTION METHOD AND DETECTION CIRCUIT

CROSS REFERENCE TO RELATED APPLICATIONS

The present application is a continuation of international application No. PCT/CN2018/091146, filed on Jun. 13, 2018, of which is incorporated herein by reference in its entirety.

TECHNICAL FIELD

The present application relates to a noise detection circuit, noise detection method and a detection circuit; in particular, to a noise detection circuit, noise detection method and a detection circuit that can perform touch detection and noise detection simultaneously.

BACKGROUND

With the advancement of technology, the operation interfaces of various electronic products have become humanized in recent years. For example, by using the touch panel, the user can directly operate on the screen with fingers or a stylus to input messages/texts/patterns, thereby saving the trouble of using a keyboard or keypad or other input devices. As a matter of fact, a touchscreen often consists of a sensor panel and a display disposed behind the sensor panel. The electronic device determines the intention of the touching according to the location at which the user touch the sensor panel and the screen content presented at the time of the touching, and perform a corresponding operation result.

Specifically, the touchscreen is mainly affected by noise from, for example, a display or charger. Current technology has developed noise detection technology capable of detecting the noise spectrum; however, currently, one cannot perform touch detection and noise detection simultaneously, as a result, the touch control system has to spend extra times for performing noise detection in addition to the time for touch detection, thereby limiting the improvement to the report rate.

In view of the foregoing, there is a need to improve the state of art.

SUMMARY

In view of the foregoing, the purpose of some embodiments of the present application is to provide a noise detection circuit and method and detection circuit that can perform touch detection and noise detection simultaneously to address the issues in the current art.

To solve the above-mentioned technical problems, embodiments of the present application provide a noise detection circuit, including: a mixing module, coupled to a plurality of receiving electrodes of a touch panel in a touch control system and configured to, perform a mixing operation to an integrated signal based on a plurality of frequencies to generate a plurality of in-phase signals corresponding to the plurality of frequencies and a plurality of quadrature signals corresponding to the plurality of frequencies, wherein the integrated signal is associated with a plurality of receiving signals carried by the plurality of receiving electrodes; a computing module, coupled to the mixing module and configured to generate a plurality of output signals corresponding to the plurality of frequencies according to the plurality of in-phase signals and the plurality of quadrature signals, wherein when the touch control system uses a first frequency of the plurality of frequencies to perform touch detection, the computing module performs a signal cancellation operation to a first in-phase signal of the plurality of in-phase signals that is corresponding to the first frequency and a first quadrature signal of the plurality of quadrature signals that is corresponding to the first frequency, to calculate and output a first output signal of the plurality of output signals that is corresponding to the first frequency; and a determination module, coupled to the computing module and configured to select a best output signal from the plurality of output signals and output a best frequency, wherein the best frequency corresponds to the best output signal, and the best output signal has the minimum value among the plurality of output signals.

For example, the mixing module includes a plurality of mixing units, configured to perform the mixing operational to the integrated signal based on a plurality of frequencies, respectively.

For example, a mixing unit of the plurality of mixing units includes: a first mixer, configured to mix the integrated signal with a first single-frequency signal, to generate a first mixing result; a first accumulator, coupled to the first mixer, configured to accumulate the first mixing result to generate a second in-phase signal of the plurality of in-phase signals that is corresponding to the second frequency; a second mixer, configured to mix the integrated signal with a second single-frequency signal to generate a second mixing result, wherein the second single-frequency signal and the first single-frequency signal have a phase difference of $\pi/2$ therebetween; and a second accumulator, coupled to the second mixer, configured to accumulate the second mixing result to generate a second quadrature signal of the plurality of quadrature signals that is corresponding to the second frequency.

For example, the mixing module unit includes: a first mixer, configured to mix the integrated signal with a plurality of first single-frequency signal, respectively, to generate a plurality of first mixing results corresponding to the plurality of frequencies, wherein the plurality of first single-frequency signal respectively have the plurality of frequencies; a first accumulator, coupled to the first mixer and configured to accumulate the plurality of first mixing results respectively, to generate the plurality of in-phase signals corresponding to the plurality of frequencies, respectively; a second mixer, configured to mix the integrated signal respectively with a plurality of second single-frequency signals, to generate a plurality of second mixing results corresponding to the plurality of frequencies, wherein the plurality of second single-frequency signals respectively have the plurality of frequencies, and the first single-frequency signal and the second single-frequency signal corresponding to the same frequency have a phase difference of $\pi/2$ therebetween; and a second accumulator, coupled to the second mixer and configured to accumulate the plurality of second mixing results, respectively, to generate the plurality of in-phase signals corresponding to the plurality of frequencies, respectively.

For example, the signal cancellation operation includes performing a rotation operation to the first in-phase signal and the quadrature signal, to generate a rotated in-phase signal and a rotated quadrature signal by the computing module, and calculating and outputting the first output signal of the plurality of output signals that is corresponding to the first frequency according to the rotated quadrature signal by the computing module.

For example, when the touch control system performs touch detection based on the first frequency performing, the computing module performs the following steps to perform the rotation operation to the first in-phase signal and the first quadrature signal, thereby generating the rotated in-phase signal and the rotated quadrature signal: performing the operation of $$\begin{bmatrix} I_k^R \\ Q_k^R \end{bmatrix} = \begin{bmatrix} \cos\theta_D & -\sin\theta_D \\ \sin\theta_D & \cos\theta_D \end{bmatrix} \begin{bmatrix} I_k \\ Q_k \end{bmatrix};$$

wherein, $I_k$ represents the first in-phase signal, $Q_k$ represents the first quadrature signal, $I_k^R$ represents the rotated in-phase signal, $Q_k^R$ represents the rotated quadrature signal, and $\theta_D$ represents an angle of rotation.

For example, the touch control system uses the first frequency to perform touch detection; the computing module obtains a touch in-phase signal, a touch quadrature signal, a non-touch in-phase signal and a non-touch quadrature signal; the touch in-phase signal and the touch quadrature signal form a first vector, the non-touch in-phase signal and the non-touch quadrature signal form a second vector; the computing module obtains the angle of rotation as a phase angle of a vector difference between the first vector and the second vector.

For example, the computing module further performs the following steps to calculate the first output signal corresponding to the first frequency according to the rotated quadrature signal: calculating an average value of the rotated quadrature signal; and calculating a subtraction result between the rotated quadrature signal and the average value, wherein the first output signal is associated with the subtraction result.

For example, the signal cancellation operation including the computing module calculate an energy signal according to the first in-phase signal and the quadrature signal, and subtracting an average energy signal from the energy signal to generate the first output signal as the subtraction result of the energy signal and the average energy signal.

For example, when the touch control system performs touch detection based on the first frequency, the computing module calculates and outputs a second output signal corresponding to the second frequency according to a second in-phase signal of the plurality of in-phase signals that is corresponding to a second frequency of the plurality of frequencies and a second quadrature signal of the plurality of quadrature signals that is corresponding to the second frequency, wherein the second output signal is associated with an amplitude formed by the second in-phase signal and the second quadrature signal, and the second frequency differs from the first frequency.

For example, the touch control system further includes a signal processing module, configured to generate the integrated signal according to at least one of the plurality of receiving signals.

For example, the touch control system further includes: a signal generator, coupled between the determination module and a transfer electrode of the touch panel; wherein, during a first time interval, the signal generator generates a first transfer signal having the first frequency to the transfer electrode, the first time interval is the time interval that the touch control system uses the first frequency to perform touch detection; wherein, during a second time interval, the signal generator generates a second transfer signal having the best frequency to the transfer electrode.

For example, the signal cancellation operation including the computing module calculates an average in-phase signal and an average quadrature signal; the computing module subtracts the average in-phase signal and the average quadrature signal from the first in-phase signal and the quadrature signal respectively to obtain a subtraction result, and generates the first output signal according to the subtraction result, wherein the first output signal is associated with an energy or an amplitude of the subtraction result.

To solve the above-mentioned technical problems, embodiments of the present application further provide a detection circuit, including a mixing module, coupled to a plurality of receiving electrodes of a touch panel in a touch control system, wherein the touch control system uses a first frequency of the plurality of frequencies to perform touch detection, and the mixing module is configured to perform a mixing operation based on a plurality of frequencies to a integrated signal to generate a plurality of in-phase signals corresponding to the plurality of frequencies and a plurality of quadrature signals corresponding to the plurality of frequencies, wherein the integrated signal is associated with a plurality of receiving signal carried by the plurality of receiving electrodes, and the plurality of frequencies differs from the first frequency; and a computing module, coupled to the mixing module and configured to generate a plurality of output signals corresponding to the plurality of frequencies according to the plurality of in-phase signals and the plurality of quadrature signals, wherein a output signal of the plurality of output signals that is corresponding to a second frequency of the plurality of frequencies is associated with an amplitude formed by a second in-phase signal and a second quadrature signal corresponding to the second frequency; and a determination module, coupled to the computing module and configured to determine whether the plurality of output signals are greater than a specified value.

To solve the above-mentioned problems, embodiments of the present application further provide a noise detection method, including: using the signal generator to generate a first transfer signal having a first frequency of a plurality of frequencies to a transfer electrode; receiving an integrated signal, wherein the integrated signal is associated with a plurality of receiving signal carried by a plurality of receiving electrodes, and the plurality of receiving signals is corresponding to the first transfer signal having the first frequency; performing a mixing operation to the integrated signal based on the plurality of frequencies to generate a plurality of in-phase signals corresponding to the plurality of frequencies and a plurality of quadrature signals corresponding to the plurality of frequencies; according to the plurality of in-phase signals and the plurality of quadrature signals, generating a plurality of output signals corresponding to the plurality of frequencies; selecting a best output signal from the plurality of output signals and outputting a best frequency, wherein the best frequency is corresponding to the best output signal, and the best output signal has the minimum value among the plurality of output signals.

For example, the step of generating a plurality of output signals corresponding to the plurality of frequencies according to the plurality of in-phase signals and a plurality of quadrature signals includes: performing a rotation operation to a first in-phase signal of the plurality of in-phase signals that is corresponding to the first frequency and a first quadrature signal of the plurality of quadrature signals that is corresponding to the first frequency to generate a rotated in-phase signal and a rotated quadrature signal; calculating and outputting a first output signal corresponding to the first frequency according to the rotated quadrature signal; and calculating and outputting a second output signal corresponding to the second frequency according to a second in-phase signal of the plurality of in-phase signals that is corresponding to a second frequency of the plurality of frequencies and a second quadrature signal of the plurality of quadrature signals that is corresponding to the second frequency, wherein the second frequency differs from the first frequency.

For example, the step of performing the rotation operation to the first in-phase signal and the first quadrature signal to generate the rotated in-phase signal and the rotated quadrature signal includes: performing the operation of $$\begin{bmatrix} I'_k \\ Q'_k \end{bmatrix} = \begin{bmatrix} \cos\theta_D & -\sin\theta_D \\ \sin\theta_D & \cos\theta_D \end{bmatrix} \begin{bmatrix} I_k \\ Q_k \end{bmatrix};$$

wherein, $I_k$ represents the first in-phase signal, $Q_k$ represents the first quadrature signal, $I_k'$ represents the rotated in-phase signal, $Q_k'$ represents the rotated quadrature signal, and $\theta_D$ represents an angle of rotation.

For example, the noise detection method further includes: obtaining a touch in-phase signal, a touch quadrature signal, a non-touch in-phase signal and a non-touch quadrature signal, wherein the touch in-phase signal and the touch quadrature signal form a first vector, and the non-touch in-phase signal and the non-touch quadrature signal form a second vector, obtaining a vector difference between the first vector and the second vector, and obtaining a phase angle having the angle of rotation of the vector difference.

For example, the step of calculating the first output signal corresponding to the first frequency according to the rotated quadrature signal includes: calculating an average value of the rotated quadrature signal; and calculating a subtraction result between the rotated quadrature signal and the average value, wherein the first output signal is associated with the subtraction result.

For example, the step of calculating and outputting the second output signal according to the second in-phase signal and the second quadrature signal includes: forming an amplitude by using the second in-phase signal and the second quadrature signal, wherein the second output signal is associated with the amplitude.

For example, the step of generating a plurality of output signals corresponding to the plurality of frequencies according to the plurality of in-phase signals and a plurality of quadrature signals includes calculating an energy signal according to a first in-phase signal of the plurality of in-phase signals that is corresponding to the first frequency and a first quadrature signal of the plurality of quadrature signals that is corresponding to the first frequency; and subtracting an average energy signal from the energy signal to generate a first output signal corresponding to the first frequency as the subtraction result of the energy signal and the average energy signal.

For example, the step of generating a plurality of output signals corresponding to the plurality of frequencies according to the plurality of in-phase signals and a plurality of quadrature signals includes: calculating an average in-phase signal and an average quadrature signal; subtracting the average in-phase signal and the average quadrature signal from a first in-phase signal of the plurality of in-phase signals that is corresponding to the first frequency and a first quadrature signal of the plurality of quadrature signals that is corresponding to the first frequency respectively to obtain a subtraction result; and generating the first output signal according to the subtraction result, wherein the first output signal is associated with an energy or an amplitude of the subtraction result.

The present application can perform rotation operation to in-phase signal and quadrature signal corresponding to first frequency at the same time when the touch control system uses the first frequency to perform touch detection, wherein the angle of rotation is the phase angle of the vector difference between the non-touch vector and touch vector. The present application does not require additional time for performing noise detection, and has the advantage of performing touch detection and noise detection simultaneously, thereby improving the report rate.

DETAILED DESCRIPTION

To further explain the purposes, technical solutions and advantages of the present application, the appended drawings and embodiments are provided below to give a detailed description of the present invention. It should be noted that the embodiments provided herein are used to explain the present invention, and shall not be used to limit the present application.

Figure 1:
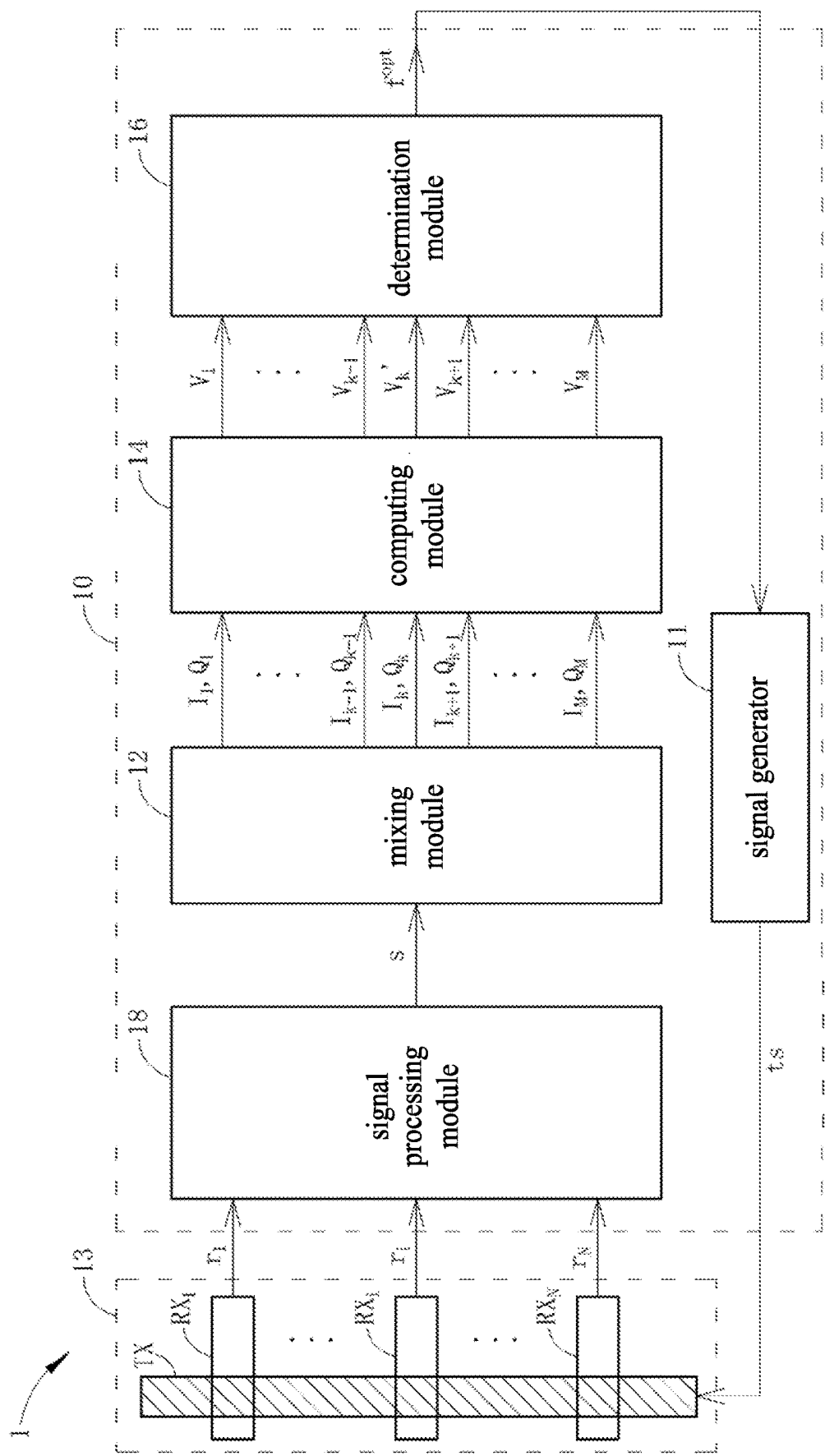
FIG. 1 is a schematic diagram of a touch control system according to embodiments of the present application.

FIG. 1 is a schematic diagram of a touch control system 1 according to embodiments of the present application; the touch control system 1 can be disposed in an electronic device such as a mobile phone, tablet, etc. The touch control system 1 includes a noise detection circuit 10 and a touch panel 13; the touch panel 13 includes a plurality of transfer electrodes TX and a plurality of receiving electrodes $RX_1$~$RX_N$. The touch control system 1 can perform touch detection and noise detection simultaneously during a detection time interval; to facilitate the discussion, only (a portion of) circuits related to noise detection in the touch control system 1 are shown in FIG. 1. Moreover, to clearly describe the inventive concept of the present application, FIG. 1 only one transfer electrode TX of the plurality of transfer electrodes TX is shown.

The noise detection circuit 10 is configured to detect a frequency among a plurality of frequencies f1~fM that is least affected by noise, and during a period after the noise detection, the touch control system 1 can use the frequency least affected by noise to perform touch detection. Generally, noise detection and touch detection are performed separately in terms of time. Unlike the current technology, the noise detection circuit 10 can perform noise detection at the same time when the touch control system 1 performs touch detection.

Specifically, the noise detection circuit 10 includes a signal generator 11, a signal processing module 18, a mixing module 12, a computing module 14 and a determination module 16. When the touch control system 1 uses a frequency $f_k$ corresponding to a plurality of frequencies $f_1 \sim f_M$ to perform touch detection or during a first time interval T1, the signal generator 11 generates a transfer signal ts having the frequency $f_k$ to the transfer electrode TX, whereas the receiving electrodes $RX_1 \sim RX_N$ generate/carries receiving signals $r_1 \sim r_N$ corresponding to the transfer signal ts. The signal processing module 18 of the noise detection circuit 10 is coupled to receiving electrodes $RX_1 \sim RX_N$ and configured to collect/integrate receiving signals $r_1 \sim r_N$ into an integrated signal s, wherein, the signal processing module 18 may include at least one of an analog front end (AFE), analog-to-digital convertor (ADC) or a filter to generate the integrated signal s according to receiving signal $r_1 \sim r_N$; in one embodiment, when ignoring the quantization error introduced by the analog front end or analog-to-digital convertor, the signal processing module 18 can generate the integrated signal s so that $s = w_1 r_1 + \ldots + w_N r_N$ (equation 1), wherein $w_1 \sim w_N$ can represent the filter coefficients. In one embodiment, when at least one touch event of the receiving electrode (e.g., $RX_g$) is known, the signal processing module 18 can exclude the receiving signal $r_g$ carried by the receiving electrodes $RX_g$ of the touch event in advance; that is, the signal processing module 18 can generate an integrated signal s', wherein $s' = w_1 r_1 + \ldots + w_{g-1} r_{g-1} + w_{g+1} r_{g+1} + \ldots + w_N r_N$ (equation 2). The signal processing module 18 can generate only the integrated signal s or only the integrated signal s'. The signal processing module 18 can generate both the integrated signal s and the integrated signal s' simultaneously. For the sake of brevity, drawings of the present application only illustrate the integrated signal s. Moreover, frequencies $f_1 \sim f_M$ are a plurality of frequencies that the touch control system 1 can use to perform touch/noise detection; in the following description, the transfer signal ts having the frequency $f_k$ generated by signal generator 11 during the first time interval T1 is taken as an example, wherein k can be an integer between 1 to M.

The mixing module 12 is coupled to the signal processing module 18 and configured to perform a mixing operation, based on a plurality of frequencies $f_1 \sim f_M$, to the integrated signal s so as to generate a plurality of in-phase signals $I_1 \sim I_M$ and a plurality of quadrature signals $Q_1 \sim Q_M$ corresponding to a plurality of frequencies $f_1 \sim f_M$. The computing module 14 is coupled to the mixing module 12, and during the first time interval T1 when the touch control system 1 uses the frequency $f_k$ to perform touch detection, the computing module 14 generate a plurality of output signals $V_1 \sim V_{k-1}$, $V_{k+1} \sim V_M$ corresponding to a plurality of frequencies $f_1 \sim f_{k-1}$, $f_{k+1} \sim f_M$ according to a plurality of in-phase signals $I_1 \sim I_{k-1}$, $I_{k+1} \sim I_M$ and a plurality of quadrature signals $Q_1 \sim Q_{k-1}$, $Q_{k+1} \sim Q_M$ corresponding to a plurality of frequencies $f_1 \sim f_{k-1}$, $f_{k+1} \sim f_M$ other than the frequency $f_k$, wherein, the output signal $V_m$ corresponding to the frequency $f_m$ (i.e., $m \neq k$) differing from frequency $f_k$ can be associated with an amplitude formed by the in-phase signals $I_m$ and the quadrature signal $Q_m$ corresponding to frequency $f_m$, wherein the output signal $V_m$ can be $V_m = I_m^2 + Q_m^2$ or $V_m = (I_m^2 + Q_m^2)^{1/2}$. Moreover, during the first time interval T1 when the touch control system 1 uses the frequency $f_k$ to perform touch detection, the computing module 14 generates the output signal $V_k'$ corresponding to the frequency $f_k$ according to the in-phase signal $I_k$ and quadrature signal $Q_k$ corresponding to frequency $f_k$.

The determination module 16 is coupled to the computing module 14 to receive output signals $V_1 \sim V_{k-1}$, $Vk'$, $V_{k+1} \sim V_M$ and is configured to from output signals $V_1 \sim V_{k-1}$, $Vk'$, $V_{k+1} \sim V_M$, select a best output signal $V^{opt}$, and output a best frequency $f^{opt}$ corresponding to best output signal $V^{opt}$, wherein the best output signal $V^{opt}$ is the one with the minimum value among the output signals $V_1 \sim V_{k-1}$, $Vk'$, $V_{k+1} \sim V_M$. In this way, during a second time interval T2 after the first time interval T1, the touch control system 1 can use the frequency $f^{opt}$ to perform touch detection; i.e., during the second time interval T2, the signal generator 11 generates the transfer signal ts having the frequency $f^{opt}$ to the transfer electrode TX.

Furthermore, the computing module 14 can consider the in-phase signal $I_k$ and quadrature signal $Q_k$ corresponding to frequency $f_k$ as a vector $Y = [I_k, Q_k]^T$, the computing module 14 can perform a signal cancellation operation to eliminate the signal component caused by the operation of touch control (the transfer signal ts having the frequency $f_k$) at the receiving electrode, so as to output the output signal $V_k'$ corresponding to the frequency $f_k$. Specifically, in one embodiment, the computing module 14 can first perform a rotation operation to obtain a rotated vector $[I_k^R, Q_k^R]^T$; i.e., to obtain a rotated in-phase signal $I_k^R$ and a rotated quadrature signal $Q_k^R$, and then perform the signal cancellation operation to the rotated quadrature signal $Q_k^R$; i.e., calculating and outputting the output signal $V_k'$ according to the rotated quadrature signal $Q_k^R$.

Specifically, the computing module 14 can perform the computation of equation 3 to the vector $[I_k, Q_k]^T$, the computation of the equation 3 means rotating the vector $[I_k, Q_k]^T$ by an angle of rotation $\theta_D$. Moreover, in one embodiment, during a period before the first time interval T1 (e.g., during a calibration time interval before the first time interval T1), the computing module 14 can count/calculate an average value $Q_{km}$ (e.g., $Q_{km} = \text{ave}(Q_k^R)$) of the rotated quadrature signal $Q_k^R$, wherein the ave(•) represents an average operation), and the computing module 14 can calculate the output signal $V_k'$ corresponding to frequency $f_k$ as $\sqrt{\gamma}|Q_k^R - Q_{km}|$ (i.e., $V_k' = \sqrt{\gamma}|Q_k^R - Q_{km}|$) or as $\gamma|Q_k^R - Q_{km}|^2$ (i.e., $V_k' = \gamma|Q_k^R - Q_{km}|^2$), wherein, $\gamma$ is a constant, which can be adjusted depending on the actual condition (e.g., the signal-to-noise ratio (SNR)); in one embodiment, $\gamma$ can be 2. Moreover, $Q_{km}$ can represents the signal component caused by the operation of touch control (the transfer signal ts having the frequency $f_k$) at the receiving electrode.

$$\begin{bmatrix} I_k^R \\ Q_k^R \end{bmatrix} = \begin{bmatrix} \cos\theta_D & -\sin\theta_D \\ \sin\theta_D & \cos\theta_D \end{bmatrix} \begin{bmatrix} I_k \\ Q_k \end{bmatrix} \qquad \text{(equation 3)}$$

From another point of view, when the touch control system 1 uses frequency $f_k$ to perform the touch control, the output signals $V_1 \sim V_{k-1}$, $V_{k+1} \sim V_M$ calculated by the computing module 14 can be considered as the amplitude or energy of the noise at frequencies $f_1 \sim f_{k-1}$, $f_{k+1} \sim f_M$, whereas the output signal $V_k'$ calculated by the computing module 14 can be considered as the amplitude or energy of the noise at the frequency $f_k$. By using the determination module 16 to compare the value of the output signals $V_1 \sim V_{k-1}$, $V_k'$, $V_{k+1} \sim V_M$, one can select the minimal one among output signals $V_1 \sim V_{k-1}$, $V_k'$, $V_{k+1} \sim V_M$ as the best output signal $V^{opt}$, and then output the best frequency $f^{opt}$.

Figure 2:
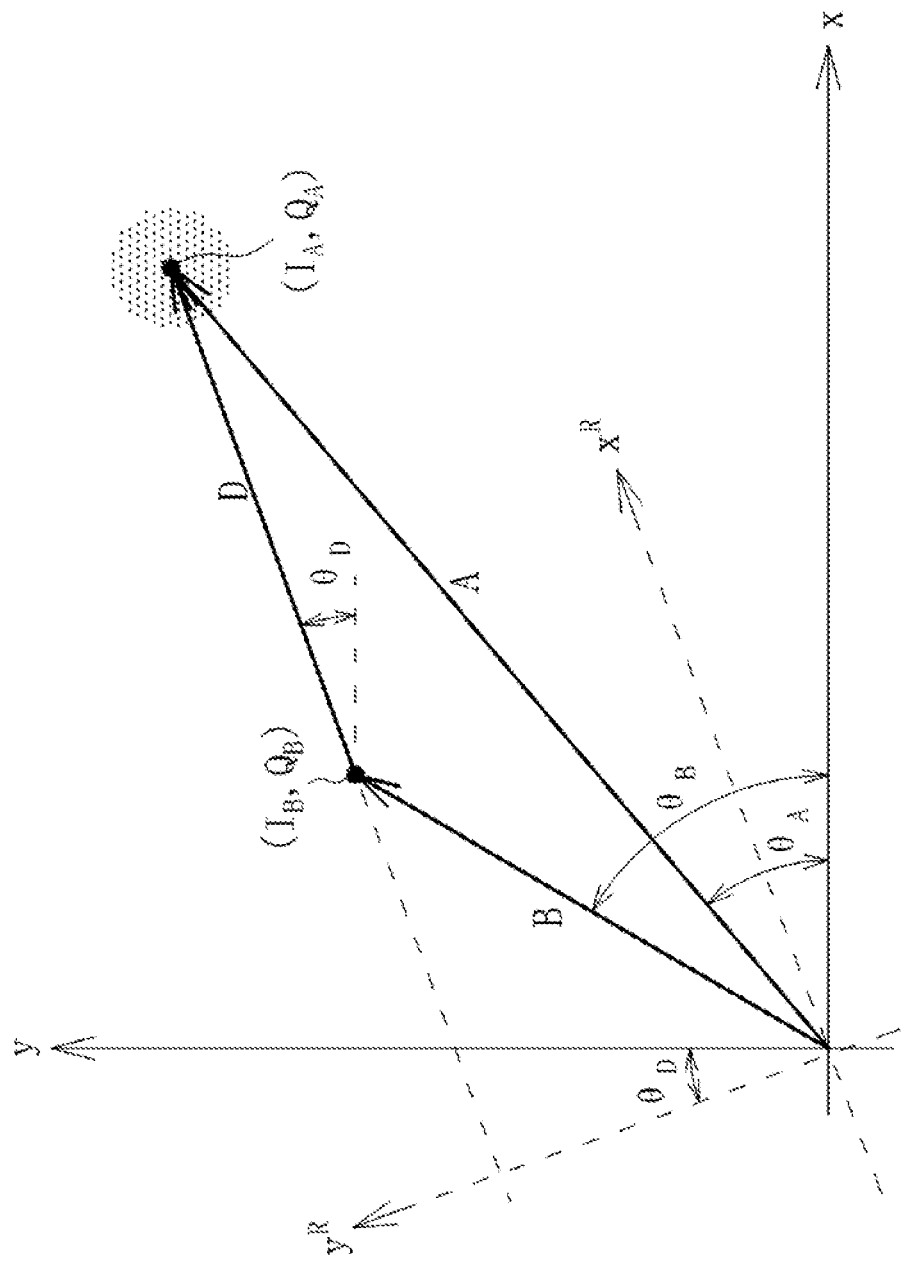
FIG. 2 is a schematic diagram of an angle of rotation according to embodiments of the present application.

The principles by which the computing module 14 performs the equation 3 are described below briefly. Reference is made to FIG. 2; FIG. 2 is a schematic diagram illustrating a vector A, a vector B and a vector difference D. The vector A represents the vector that is formed by a non-touch in-phase signal $I_A$ and a non-touch quadrature signal $Q_A$ that are received by the touch control system 1 (or formed by performing a mixing operation to a receiving signal $r_n$ of a receiving electrodes $RX_n$) when there is no touch event takes place; the vector B represents the vector that is formed by a touch in-phase signal $I_B$ and a touch quadrature signal $Q_B$ $Q_A$ that are received by the touch control system 1 (or formed by performing a mixing operation to a receiving signal $r_n$ of a receiving electrodes $RX_n$) when a touch event takes place. The vector difference D is the vector difference between the non-touch vector A and the touch vector B; in other words, the vector difference D represents the level of variation of the in-phase/quadrature signal due to the touch event. For example, when an amplitude Amp(D) of the vector difference D is greater than a threshold, it is determined that a touch event took place at the receiving electrode $RX_n$, wherein, Amp (•) represents an amplitude-extracting operator. Moreover, signals $I_A$, $Q_A$, $I_B$, $Q_B$ are the coordinate components that vectors A, B project on the coordinate axes x and y, $\theta_D$ is the included angle between the vector difference D and the x axis; that is, $\theta_D$ is a phase angle of the vector difference D.

When the computing module 14 obtains the in-phase signal $I_k$ and the quadrature signal $Q_k$, the computing module 14 does not know whether vector Y is a signal/vector resulted from a touch event or a non-touch event; yet the computing module 14 know that there is a vector difference D between a vector (vector B) resulted from a touch event and a vector (vector A) resulted from a non-touch event. Therefore, the computing module 14 performs the computation of the equation 3, which can be considered as rotating (counter-clockwisely) the coordinate axes x, y by an angle of $\theta_D$, thereby obtaining a rotated coordinate axis $x^R$, $y^R$, so that the rotated coordinate axis $x^R$ is parallel with the vector difference D. At this time, the rotated quadrature signal $Q_k^R$ can be considered as the component that the vector Y projects on the coordinate axis $y^R$, and the rotated quadrature signal $Q_k^R$ has a variation level with respect to the average value $Q_{km}$; i.e., it can represent the effect of the noise at the first frequency $f_k$. In other words, in order that the touch detection and the noise detection can be performed simultaneously, the computing module 14 ignores the effect of the noise at the rotated coordinate axis $x^R$, and only considers the effect of the noise at the rotated coordinate axis $y^R$. Moreover, from another point of view, the computing module 14 performing the computation of the equation 3 can be considered as rotating (clockwisely) the vector Y by an angle of $\theta_D$, and the rotated quadrature signal $Q_k^R$ can be considered as the component that the vector Y projects on the coordinate axis y.

In one embodiment, the computing module 14 can obtain the non-touch in-phase signal $I_A$, the non-touch quadrature signal $Q_A$, the touch in-phase signal $I_B$ and the touch quadrature signal $Q_B$, i.e., obtain the vector A and vector B during a period before the first time interval T1 (e.g., during the calibration time interval before the first time interval T1); obtain the vector difference D according to the vector A and the vector B; and obtain the included angle $\theta_D$ between the vector difference D and x axis according to the vector difference D, wherein $\theta_D$ is the phase angle of the vector difference D. In this way, the computing module 14 can perform the computation of the equation 3 during the first time interval T1.

Moreover, the computing module 14 is not limited to use the rotation operation to obtain the output signal $V_k'$. In one embodiment, when the touch control system 1 uses the frequency $f_k$ to perform touch detection, the mixing module 12 performs a mixing operation, based on the frequency $f_k$, to the integrated signal s' (which is generated by the equation 2) to generate the in-phase signal $I_k$ and the quadrature signal $Q_k$. The computing module 14 can calculate an energy signal $(I_k^2+Q_k^2)$ (or an amplitude signal $(I_k^2+Q_k^2)^{1/2}$), and then subtract an average energy signal $\text{ave}(I_k^2+Q_k^2)$ from the energy signal $(I_k^2+Q_k^2)$ (or subtract an average amplitude signal $\text{ave}((I_k^2+Q_k^2)^{1/2})$ from the amplitude signal $(I_k^2+Q_k^2)^{1/2}$), so as to generate the output signal $V_k'$ as $V_k'=I_k^2+Q_k^2-\text{ave}(I_k^2+Q_k^2)$ (or $V_k'=(I_k^2+Q_k^2)^{1/2}-\text{ave}((k^2\ Q_k^2)^{1/2})$, wherein the average energy signal $\text{ave}(I_k^2+Q_k^2)$ (or the average amplitude signal $\text{ave}((I_k^2+Q_k^2)^{1/2})$) can be obtained by the operation of the computing module 14 during calibration time interval before the first time interval T1. It should be noted that the average energy signal $\text{ave}(I_k^2+Q_k^2)$ (or $\text{ave}(I_k^2+Q_k^2)^{1/2})$) represents the signal component caused by the touch detection (the transfer signal ts having the frequency $f_k$) at the receiving electrode. Moreover, in one embodiment, when the touch control system 1 uses the frequency $f_k$ to perform touch detection, the mixing module 12 can also perform a mixing operation to the integrated signal s' (which is generated by the equation 2) based on frequencies $f_1 \sim f_{k-1}$, $f_{k+1} \sim f_M$ other than the frequency $f_k$, so as to generate in-phase signals $I_1 \sim I_k$, $I_{k+1} \sim I_M$ and quadrature signals $Q_1 \sim Q_{k-1}$, $Q_{k+1} \sim Q_M$, and generate output signals $V_1 \sim V_{k-1}$, $V_{k+1} \sim V_M$ according to in-phase signals $I_1 \sim I_{k-1}$, $I_{k+1} \sim I_M$ and quadrature signals $Q_1 \sim Q_{k-1}$, $Q_{k+1} \sim Q_M$ corresponding to the integrated signal s'.

Moreover, in the above-mentioned embodiments, the computing module 14 first performs an averaging operation corresponding to the energy/amplitude, and then performs a subtraction operation between the energy/amplitude signal and the average energy/amplitude signal; however, the present application is not limited thereto. The computing module 14 can first performs the averaging operation corresponding to the in-phase signal and the quadrature signal to obtain the same average in-phase signal $\text{ave}(I_k)$ and an average quadrature signal $\text{ave}(Q_k)$, then subtract the average in-phase signal $\text{ave}(I_k)$ and average quadrature signal $\text{ave}(Q_k)$ from the in-phase signal $I_k$ and the quadrature signal $Q_k$, respectively, so as to obtain a subtraction result $(I_k-\text{ave}(I_k), Q_k-\text{ave}(Q_k))$, and finally, perform an energy/amplitude-extraction operation to the subtraction result. In this case, the average in-phase signal $\text{ave}(I_k)$ and the average quadrature signal $\text{ave}(Q_k)$ can be obtained from the operation of the computing module 14 during the calibration time interval before the first time interval T1. In other words, the output signal $V_k'$ can also be $V_k'=[I_k-\text{ave}(I_k)]^2+[Q_k-\text{ave}(Q_k)]^2$ or $V_k'=\{[I_k-\text{ave}(I_k)]^2+[Q_k-\text{ave}(Q_k)]^2\}^{1/2}$, i.e., the output signal $V_k'$ can be an energy or an amplitude of the subtraction result $(I_k-\text{ave}(I_k), Q_k-\text{ave}(Q_k))$, which also falls within the scope of the present application.

Figure 3:
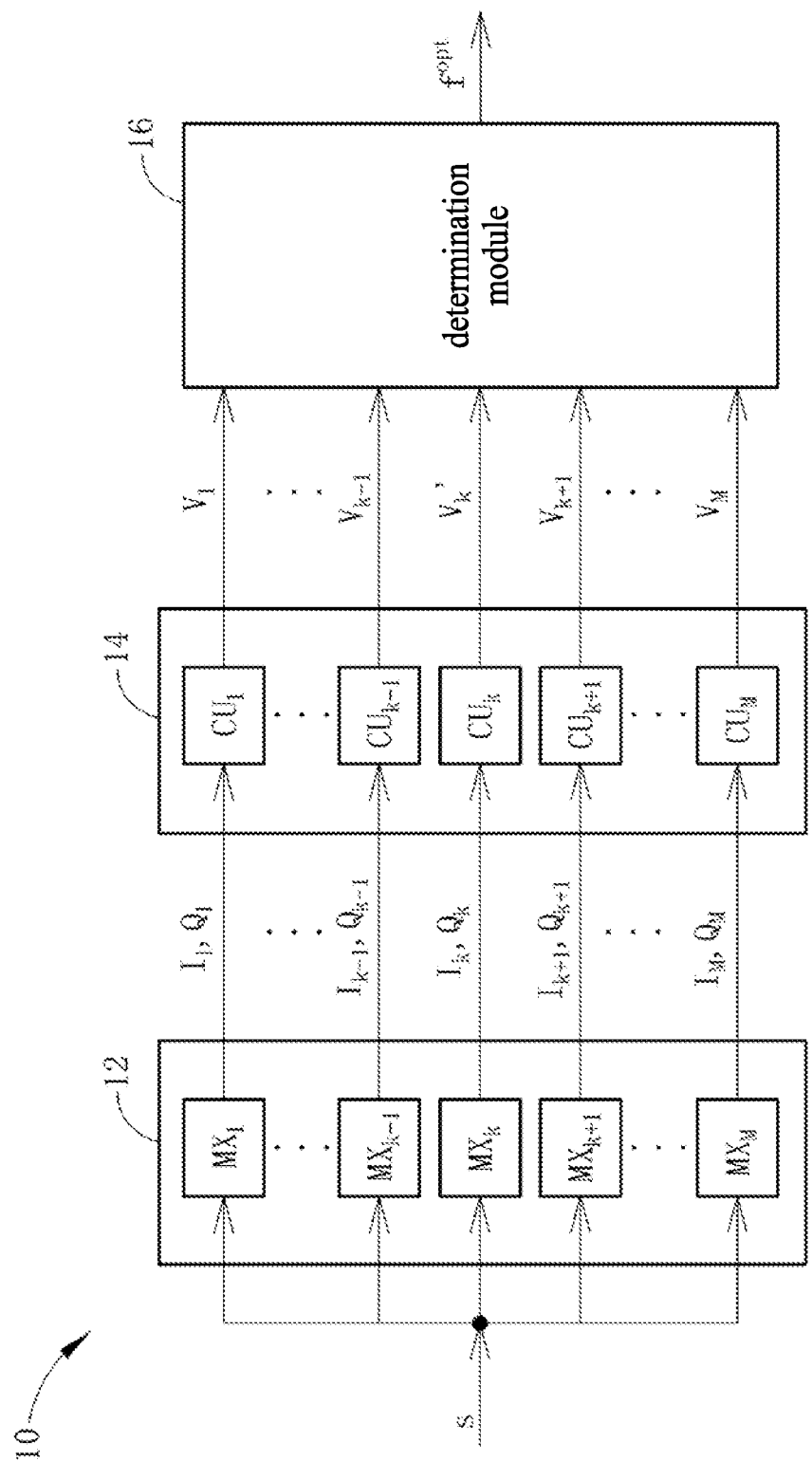
FIG. 3 is a schematic diagram of a noise detection circuit according to embodiments of the present application.

On the other hand, the mixing module 12 can uses parallel processing to simultaneously perform a mixing operation based on frequencies $f_1 \sim f_M$ to the integrated signal s, respectively; the computing module 14 can use parallel processing to calculate and output the output signals $V_1 \sim V_M$, respectively. For example, reference is made to FIG. 3; FIG. 3 is a schematic diagram of mixing module 12 and computing module 14 according to embodiments of the present application. The mixing module 12 can include a plurality of mixing units $MX_1 \sim MX_M$, which are configured to perform a mixing operation based on frequencies $f_1 \sim f_M$ to the integrated signal s, respectively, so as to generate $(I_1, Q_1) \sim (I_M, Q_M)$, respectively. The computing module 14 can include a plurality of calculating units $CU_1 \sim CU_M$, and when the touch control system 1 performs touch detection based on the frequency $f_k$, the calculating units $CU_1 \sim CU_{k-1}$, $CU_{k+1} \sim CU_K$ are configured to generate a plurality of output signals $V_1 \sim V_{k-1}$, $V_{k+1} \sim V_M$ as $V_m = I_m^2 + Q_m^2$ or $V_m = (I_m^2 + Q_m^2)^{1/2}$ corresponding to a plurality of frequencies $f_1 \sim f_{k-1}$, $f_{k+1} \sim f_M$, wherein m≠k, and the calculating unit $CU_k$ generates the output signal $V_k'$ corresponding to frequency $f_k$ as $V_k' = \sqrt{\gamma} |Q_k^R - Q_{km}|$ or $\gamma |Q_k^R - Q_{km}|^2$.

Figure 4:
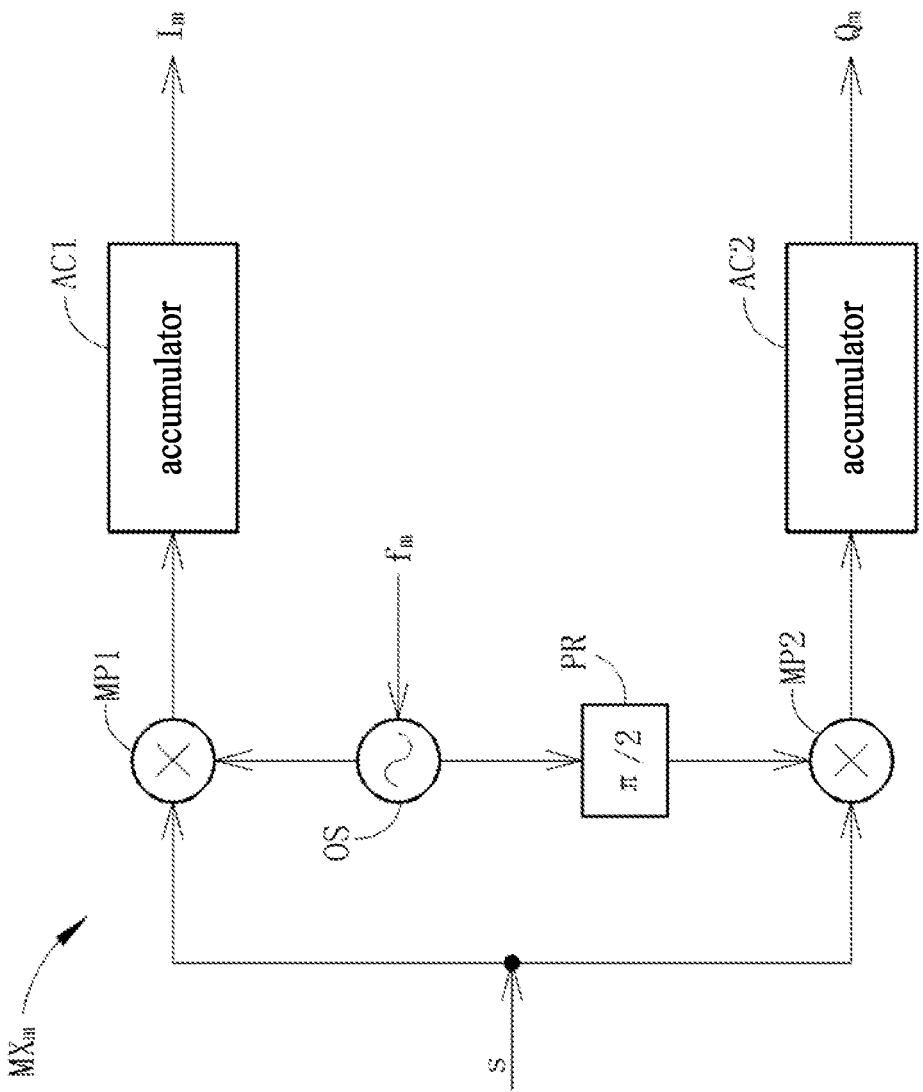
FIG. 4 is a schematic diagram of a mixer unit according to embodiments of the present application.

The structure of any mixer unit $MX_m$ of the mixing units $MX_1 \sim MX_M$ is discussed with reference to FIG. 4; FIG. 4 is a schematic diagram of the mixer unit $MX_m$, wherein the mixer unit $MX_m$ is configured to perform a mixing operation based on frequency $f_m$ to the integrated signal s, and it can include mixers MP1, MP2, accumulators AC1, AC2, oscillator OS and a phase-rotating unit PR. The mixer MP1 is configured to mix the integrated signal s with a first single-frequency signal having the frequency $f_m$ (e.g., $\cos 2\pi f_m t$ or $\sin 2\pi f_m t$), so as to generate a first mixing result; the accumulator AC1 is coupled to the mixer MP1 and is configured to accumulate the first mixing result, so as to generate an in-phase signal $I_m$ corresponding to the frequency $f_m$; the mixer MP2 is configured to mix the integrated signal s with a second single-frequency signal having the frequency $f_m$ (e.g., $\sin 2\pi f_m t$ or $\cos 2\pi f_m t$), so as to generate a second mixing result; the accumulator AC2 is coupled to the mixer MP2 and configured to accumulate the second mixing result performs, so as to generate a quadrature signal $Q_m$ corresponding to the frequency $f_m$. In this embodiment, there is a phase difference of $\pi/2$ between the first single-frequency signal and the second single-frequency signal.

Figure 5:
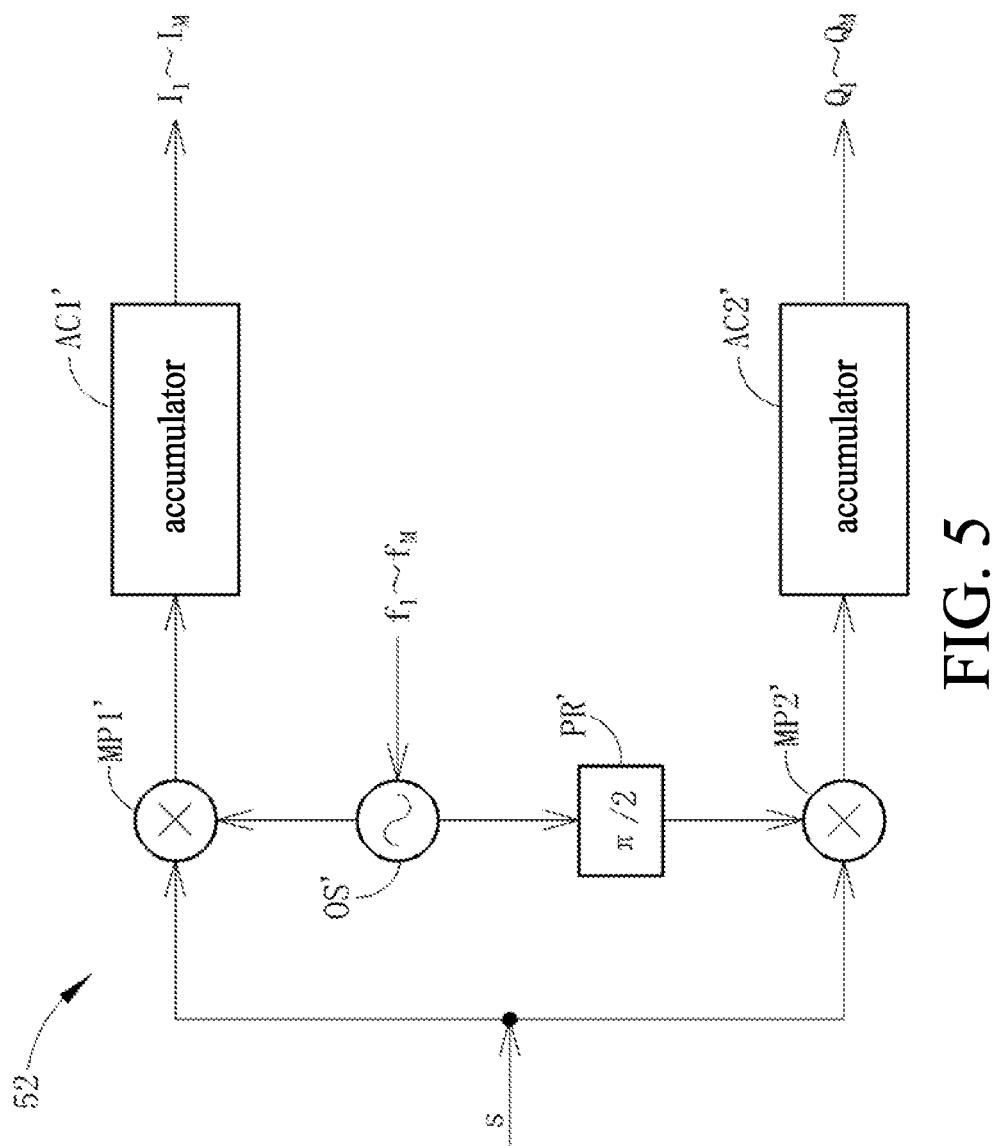
FIG. 5 is a schematic diagram of a mixing module according to embodiments of the present application.

On the other hand, other than the parallel processing, the mixing module 12 can use time division series processing to perform, respectively, a mixing operation based on frequencies $f_1 \sim f_M$ to the integrated signal s at different times. Reference is made to FIG. 5; FIG. 5 is a schematic diagram of a mixing module 52 according to embodiments of the present application; the mixing module 52 can be configured to implement the mixing module 12; the structure of the mixing module 52 is similar to that of the mixer unit $MX_m$, and includes mixers MP1', MP2', accumulators AC1', AC2', an oscillator OS' and a phase-rotating unit PR'. The mixer MP1' can perform, respectively, a mixing operation based on frequencies $f_1 \sim f_M$ to the integrated signal s at different times, by increasing the clock rate; that is, perform mixing to the integrated signal s at different times, respectively, based on a plurality of first single-frequency signals (e.g., $\cos 2\pi f_1 t \sim \cos 2\pi f_M t$ or $\sin 2\pi f_1 t \sim \sin 2 f_M t$) of frequencies $f_1 \sim f_M$, so as to generate a plurality of first mixing results corresponding to frequencies $f_1 \sim f_M$; the accumulator AC1' is coupled to the mixer MP1' and configured to accumulate the plurality of first mixing results, respectively, so as to generate the plurality of in-phase signals $I_1 \sim I_M$ corresponding to a plurality of frequencies $f_1 \sim f_M$, respectively. The mixer MP2' is configured to perform mixing to the integrated signal s at different times, respectively, based on a plurality of second single-frequency signals (e.g., $\sin 2\pi f_1 t \sim \sin 2\pi f_M t$ or $\cos 2\pi f_1 t \sim \cos 2\pi f_M t$) of frequencies $f_1 \sim f_M$, so as to generate a plurality of second mixing results corresponding to frequencies $f_1 \sim f_M$; the accumulator AC2' is coupled to the mixer MP1' and configured to accumulate the plurality of second mixing results, respectively, so as to generate the plurality of quadrature signals $Q_1 \sim Q_M$ corresponding to a plurality of frequencies $f_1 \sim f_M$, respectively. In this embodiment, there is a phase difference of $\pi/2$ between the first single-frequency signal and the second single-frequency signal corresponding to the same frequency. Moreover, the clock rate of the mixers MP1', MP2' is M times to that of the mixers MP1, MP2.

Figure 6:
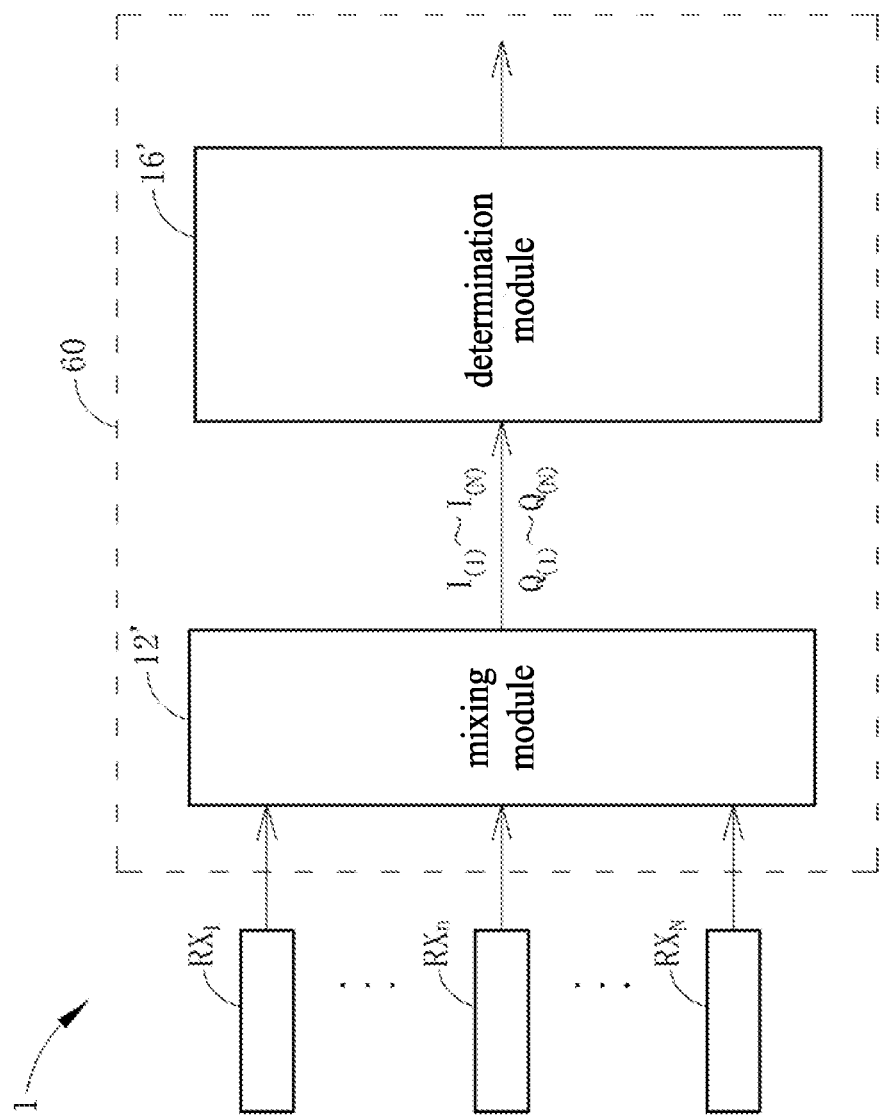
FIG. 6 is a schematic diagram of a touch control system according to embodiments of the present application.

Moreover, reference is made to FIG. 6; FIG. 6 illustrates (a portion of) circuits in the touch control system 1 related to the touch detection. The touch control system 1 includes a touch detection circuit 60; the touch detection circuit 60 is coupled to the receiving electrodes $RX_1 \sim RX_N$, and it includes a mixing module 12' and a determination module 16'. The mixing module 12' is configured to perform a mixing operation to the receiving signals $r_1 \sim r_N$ one-by-one, so as to obtain in-phase signals $I_{(1)} \sim I_{(N)}$ and quadrature signals $Q_{(1)} \sim Q_{(N)}$ corresponding to receiving electrodes $RX_1 \sim RX_N$, and the determination module 16' can determine whether a touch event takes place at the receiving electrodes $RX_1 \sim RX_N$ according to in-phase signals $I_{(1)} \sim I_{(N)}$ and quadrature signals $Q_{(1)} \sim Q_{(N)}$. In one embodiment, the touch control system 1 can obtain a non-touch in-phase signal $I_{ND}$ and a non-touch quadrature signal $Q_{ND}$ during a calibration stage, and the determination module 16' determines the occurrence of the touch event by comparing the in-phase signals $I_{(n)}$ and the quadrature signal $Q_{(n)}$ with the non-touch in-phase signal $I_{ND}$ and the non-touch quadrature signal $Q_{ND}$. For example, when the $\text{Amp}([I_{(n)}, Q_{(n)}]^T - [I_{ND}, Q_{ND}]^T)$ is greater than a threshold, or when $|\text{Amp}([I_{(n)}, Q_{(n)}]^T) - \text{Amp}([I_{ND}, Q_{ND}]^T)|$ is greater than a threshold, the determination module 16' determines that a touch event takes place at the receiving electrode $RX_{(n)}$.

Figure 7:
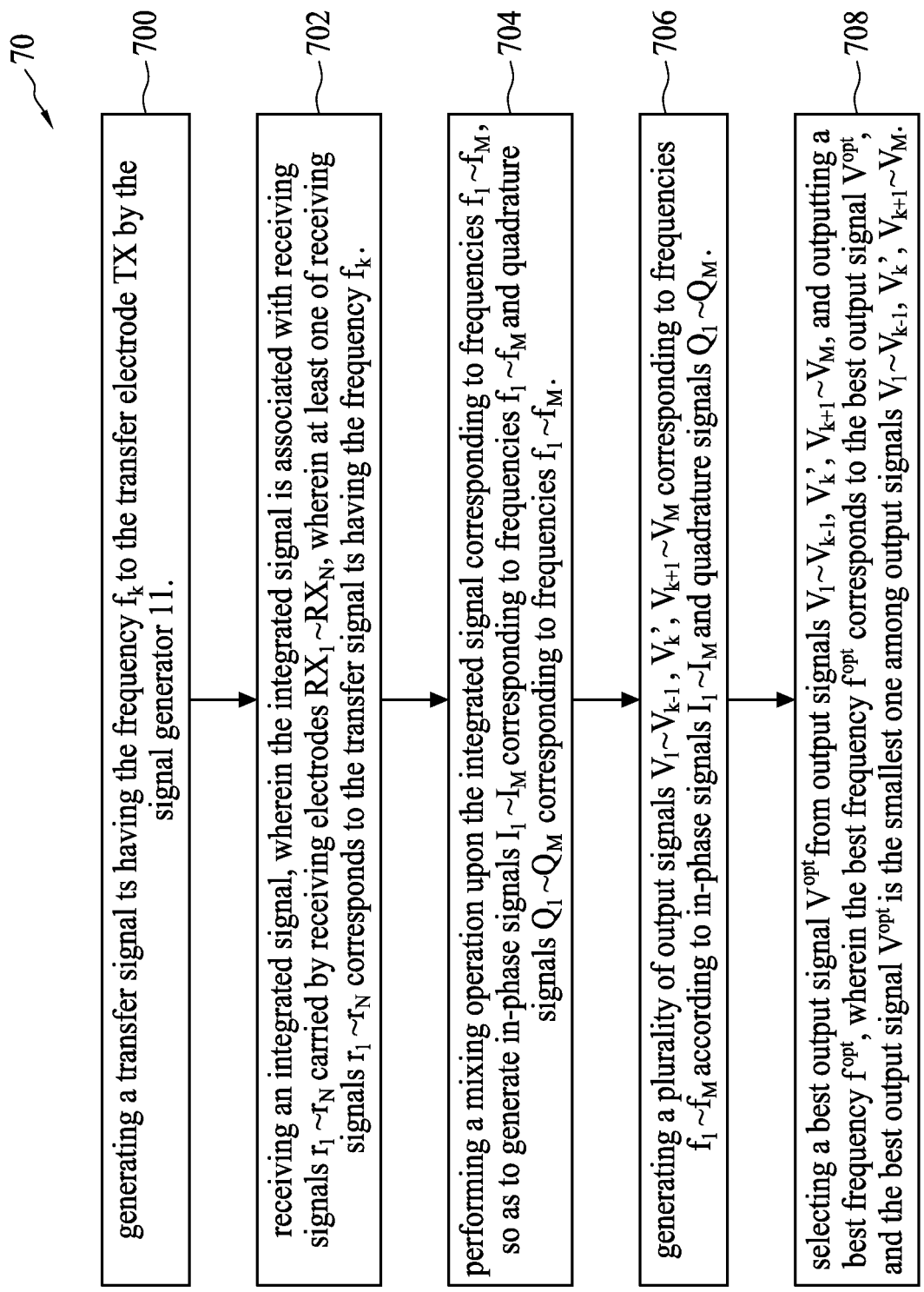
FIG. 7 is a flow chart illustrating a noise detection process according to embodiments of the present application.

The operation of the touch control system 1 can be summarized as a noise detection process 70, see, FIG. 7; the noise detection process 70 includes the following steps:

Step 700: generating a transfer signal ts having the frequency $f_k$ to the transfer electrode TX by the signal generator 11.

Step 702: receiving an integrated signal, wherein the integrated signal is associated with receiving signals $r_1 \sim r_N$ carried by receiving electrodes $RX_1 \sim RX_N$, wherein at least one of receiving signals $r_1 \sim r_N$ corresponds to the transfer signal ts having the frequency $f_k$.

Step 704: performing a mixing operation to the integrated signal based on frequencies $f_1 \sim f_M$, so as to generate in-phase signals $I_1 \sim I_M$ corresponding to frequencies $f_1 \sim f_M$ and quadrature signals $Q_1 \sim Q_M$ corresponding to frequencies $f_1 \sim f_M$.

Step 706: generating a plurality of output signals $V_1 \sim V_{k-1}$, $V_k'$, $V_{k+1} \sim V_M$ corresponding to frequencies $f_1 \sim f_M$ according to in-phase signals $I_1 \sim I_M$ and quadrature signals $Q_1 \sim Q_M$.

Step 708: selecting a best output signal $V^{opt}$ from output signals $V_1 \sim V_{k-1}$, $V_k'$, $V_k + \sim V_M$, and outputting a best frequency $f^{opt}$, wherein the best frequency $f^{opt}$ corresponds to the best output signal $V^{opt}$, and the best output signal $V^{opt}$ is the smallest one among output signals $V_1 \sim V_{k-1}$, $V_k'$, $V_{k+1} \sim V_M$.

Figure 8:
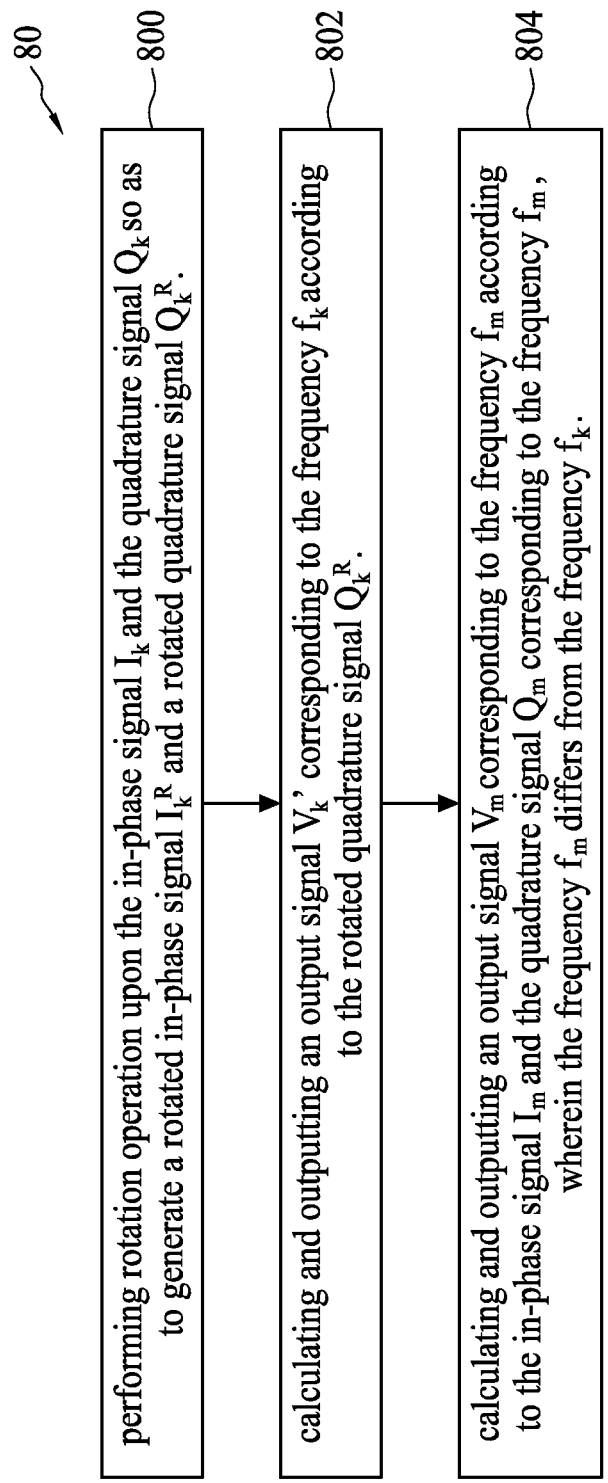
FIG. 8 is a flow chart illustrating a process according to embodiments of the present application.

The integrated signal in Step 702 can be the integrated signal s generated by the equation 1; in this case, the details of Step 706 can be summarized as a process 80 (see, FIG. 8); the process 80 includes the following steps:

Step 800: performing rotation operation to the in-phase signal $I_k$ and the quadrature signal $Q_k$ so as to generate a rotated in-phase signal $I_k^R$ and a rotated quadrature signal $Q_k^R$.

Step 802: calculating and outputting an output signal $V_k'$ corresponding to the frequency $f_k$ according to the rotated quadrature signal $Q_k^R$.

Step 804: calculating and outputting an output signal $V_m$ corresponding to the frequency $f_m$ according to the in-phase signal $I_m$ and the quadrature signal $Q_m$ corresponding to the frequency $f_m$, wherein the frequency $f_m$ differs from the frequency $f_k$.

Figure 9:
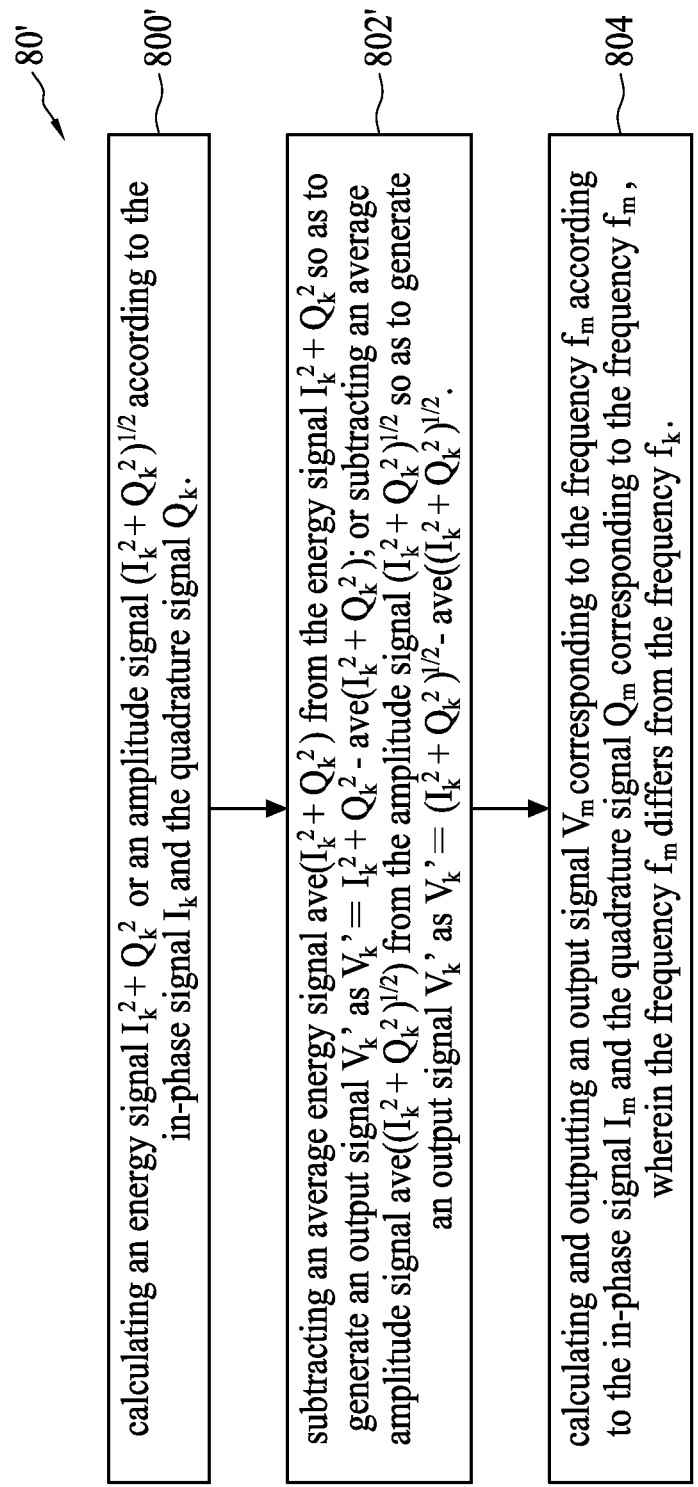
FIG. 9 is a flow chart illustrating a process according to embodiments of the present application.

Moreover, the integrated signal in Step 702 can be the integrated signal s' generated by the equation 2; in this case, the details of Step 706 can be summarized as a process 80' (see, FIG. 9); the process 80' includes the following steps:

Step 800': calculating an energy signal $I_k^2+Q_k^2$ or an amplitude signal $(I_k^2+Q_k^2)^{1/2}$ according to the in-phase signal $I_k$ and the quadrature signal $Q_k$.

Step 802': subtracting an average energy signal $ave(I_k^2+Q_k^2)$ from the energy signal $I_k^2+Q_k^2$ so as to generate an output signal $V_k'$ as $V_k'=I_k^2+Q_k^2-ave(I_k^2+Q_k^2)$; or subtracting an average amplitude signal $ave((I_k^2+Q_k^2)^{1/2})$ from the amplitude signal $(I_k^2+Q_k^2)^{1/2}$ so as to generate an output signal $V_k'$ as $V_k'=(I_k^2+Q_k^2)^{1/2}-ave((I_k^2+Q_k^2)^{1/2}$.

Step 804: calculating and outputting an output signal $V_m$ corresponding to the frequency $f_m$ according to the in-phase signal $I_m$ and the quadrature signal $Q_m$ corresponding to the frequency $f_m$, wherein the frequency $f_m$ differs from the frequency $f_k$.

With respect to the operational details of processes 70, 80, 80', references can be made to above-mentioned relevant paragraphs, and are omitted herein.

Briefly, the touch control system 1 uses the frequency $f_k$ to perform touch detection and, at the same time, perform rotation operation to the in-phase signal $I_k$ and quadrature signal $Q_k$ corresponding to frequency $f_k$, wherein the angle of rotation $\theta_D$ is the phase angle of the vector difference D between the non-touch vector A and the touch vector B. The touch control system 1 does not require additional time for performing noise detection, and has the advantage of performing touch detection and noise detection simultaneously, thereby increasing the report rate.

The above-mentioned embodiments are provided to discuss the concept of the present application, and persons having ordinary skill in the art can made various modification based thereon; however, the present application is not limited thereto. For example, the above-mentioned output signals $V_1 \sim V_{k-1}$, $V_k'$, $V_{k+1} \sim V_M$ only consider amplitude or energy of the noise to the frequencies $f_1 \sim f_M$ at a single time moment (or a single frame); yet the present application is not limited thereto; the output signals $V_1 \sim V_{k-1}$, $V_k'$, $V_{k+1} \sim V_M$ can be a statistical average of a plurality of tome moments (or a plurality of frames). For example, the output signal $V_m$ can be $V_m=\Sigma_j(I_{m,j}^2+Q_{m,j}^2)$ or $V_m=(\Sigma_j(I_{m,j}^2+Q_{m,j}^2))^{1/2}$, whereas the output signal $V_k'$ can be $V_k'=\sqrt{\gamma(\Sigma_j(Q_{k,j}^R-Q_{km})^2)^{1/2}}$ or $\gamma\Sigma_j(Q_{k,j}^R-Q_{km})^2$, wherein j is the time index or frame index.

Figure 10:
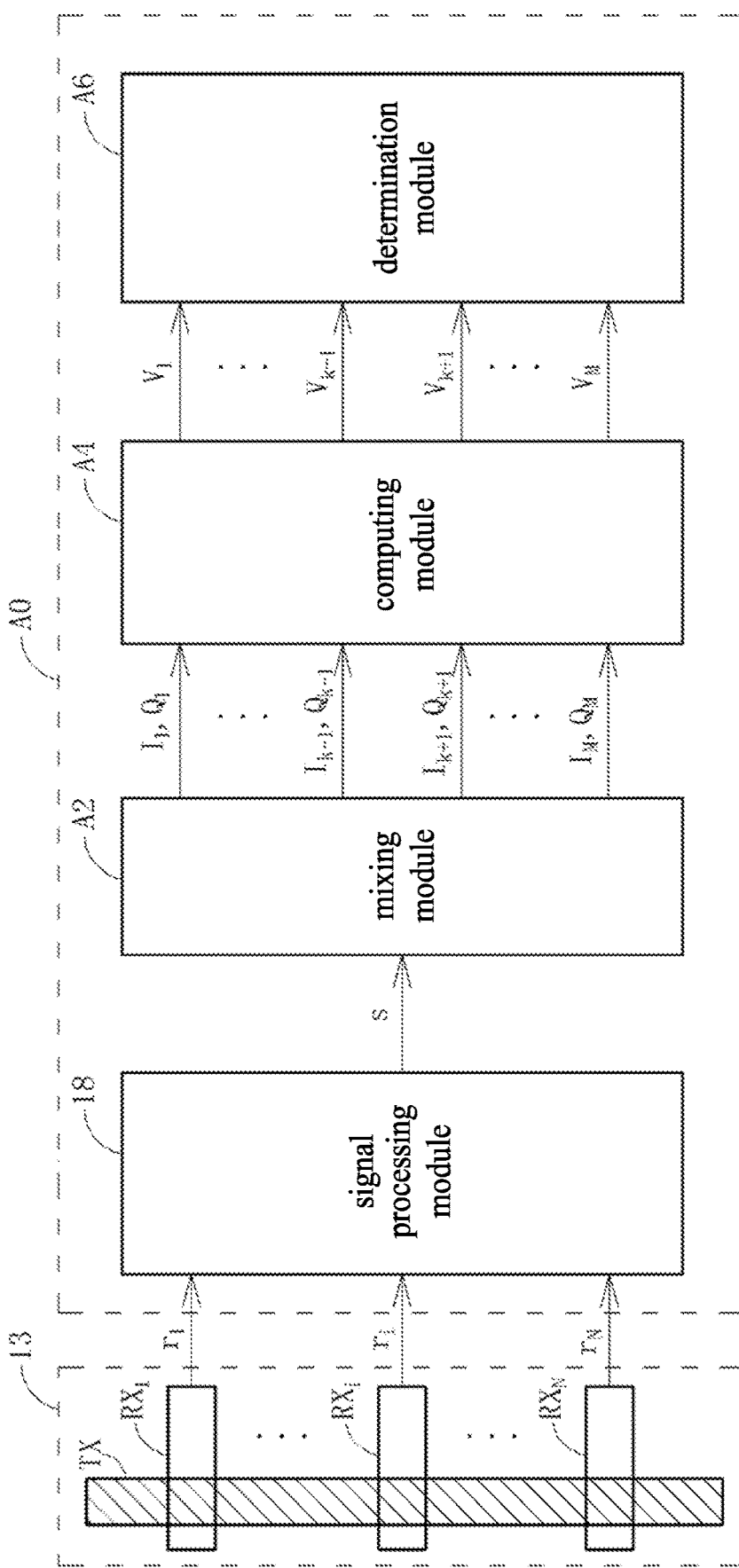
FIG. 10 is a schematic diagram of a detection circuit according to embodiments of the present application.

Moreover, reference is made to FIG. 10; FIG. 10 is a schematic diagram of a detection circuit A0 according to embodiments of the present application. The detection circuit A0 can be applied in the touch control system, the detection circuit A0 can detect whether there is a signal resulted from an external active stylus pen or a hotknot device at a specific frequency (one of frequencies $f_1 \sim f_{k-1}$, $f_{k+1} \sim f_M$) at the same time when the touch control system uses the transfer signal ts of the frequency $f_k$ to perform touch detection. The detection circuit A0 is similar to the noise detection circuit 10, and hence, the same components are given the same numerals/symbols. The detection circuit A0 differs from the detection circuit 10 in that the mixing module A2 does not perform a mixing operation based on the frequency $f_{k-}$, whereas the mixing module A2 performs the mixing operation based on frequencies $f_1 \sim f_{k-1}$, $f_{k+1} \sim f_M$ so as to generate in-phase signals $I_1 \sim I_{k-1}$, $I_{k+1} \sim I_M$ and quadrature signals $Q_1 \sim Q_{k-1}$, $Q_{k+1} \sim Q_M$. The computing module A4 of the detection circuit A0 can calculate the output signal $V_m$ of a plurality of output signals $V_1 \sim V_{k-1}$, $V_{k+1} \sim V_M$ as $V_m=I_m^2+Q_m^2$ or 是 $V_m=(I_m^2+Q_m^2)^{1/2}$. The determination module A6 of the detection circuit A0 determines whether there is an external signal energy on the frequencies $f_1 \sim f_{k-1}$, $f_{k+1} \sim f_M$ according to output signals $V_1 \sim V_{k-1}$, $V_{k+1} \sim V_M$, i.e., it determines whether the output signals $V_1 \sim V_{k-1}$, $V_{k+1} \sim V_M$ are greater than a specified value, so as to determine whether there is a signal resulted from an external active stylus pen or a hotknot device at a specific frequency (one of frequencies $f_1 \sim f_{k-1}$, $f_{k+1} \sim f_M$), wherein the specified value can be adjusted depending on actual conditions.

In view of the foregoing, the present application can perform rotation operation to in-phase signal and quadrature signal corresponding to first frequency at the same time when the touch control system uses the first frequency to perform touch detection, wherein the angle of rotation is the phase angle of the vector difference between the non-touch vector and touch vector. The present application does not require additional time for performing noise detection, and has the advantage of performing touch detection and noise detection simultaneously, thereby improving the report rate.

The foregoing outlines a portion of embodiments of the present disclosure, and shall not be used to limit the present application; any modification, equivalent substitution or improvement made within the spirits and principles of the present application shall be included in the scope of protection of the present application.

What is claimed is:

1. A noise detection circuit, comprising: a mixing module, coupled to a plurality of receiving electrodes of a touch panel in a touch control system and configured to perform a mixing operation to an integrated signal, based on a plurality of frequencies, to generate a plurality of in-phase signals corresponding to the plurality of frequencies and a plurality of quadrature signals corresponding to the plurality of frequencies, wherein the integrated signal is associated with a plurality of receiving signals carried by the plurality of receiving electrodes; a computing circuit, coupled to the mixing module and configured to generate a plurality of output signals corresponding to the plurality of frequencies according to the plurality of in-phase signals and the plurality of quadrature signals, wherein when the touch control system uses a first frequency of the plurality of frequencies to perform touch detection, the computing circuit performs a signal cancelation operation to a first in-phase signal of the plurality of in-phase signals that is corresponding to the first frequency and a first quadrature signal of the plurality of quadrature signals that is corresponding to the first frequency, to calculate and output a first output signal of the plurality of output signals that is corresponding to the first frequency, and the computing circuit, according to a second in-phase signal of the plurality of in-phase signals that is corresponding to a second frequency of the plurality of frequencies and a second quadrature signal of the plurality of quadrature signals that is corresponding to the second frequency, calculates and outputs a second output signal of the plurality of output signals that is corresponding to the second frequency without performing the signal cancelation operation, wherein the second frequency differs from the first frequency; and a determination circuit, coupled to the computing circuit and configured to select a best output signal from the plurality of output signals and output a best frequency, wherein the best frequency corresponds to the best output signal, and the best output signal has the minimum value among the plurality of output signals.

2. The noise detection circuit of claim 1, wherein the mixing module comprises a plurality of mixing units configured to, perform mixing operations to the integrated signal, based on a plurality of frequencies, respectively.

3. The noise detection circuit of claim 2, wherein a mixing unit of the plurality of mixing units comprises:
a first mixer, configured to mix the integrated signal with a first single-frequency signal, to generate a first mixing result;
a first accumulator, coupled to the first mixer and configured to accumulate the first mixing result, to generate a second in-phase signal of the plurality of in-phase signals that is corresponding to a second frequency;
a second mixer, configured to mix the integrated signal with a second single-frequency signal, to generate a second mixing result, wherein the second single-frequency signal and the first single-frequency signal have a phase difference of $\pi/2$ therebetween; and
a second accumulator, coupled to the second mixer and configured to accumulate the second mixing result, to generate a second quadrature signal of the plurality of quadrature signals that is corresponding to the second frequency.

4. The noise detection circuit of claim 1, wherein the mixing module comprises:
a first mixer, configured to mix the integrated signal with a plurality of first single-frequency signals, respectively, to generate a plurality of first mixing results corresponding to the plurality of frequencies, wherein the plurality of first single-frequency signals respectively have the plurality of frequencies;
a first accumulator, coupled to the first mixer and configured to accumulate the plurality of first mixing results respectively, to generate the plurality of in-phase signals corresponding to the plurality of frequencies, respectively;
a second mixer, configured to mix the integrated signal respectively with a plurality of second single-frequency signals, to generate a plurality of second mixing results corresponding to the plurality of frequencies, wherein the plurality of second single-frequency signals respectively have the plurality of frequencies, and the first single-frequency signal and the second single-frequency signal corresponding to the same frequency have a phase difference of $\pi/2$ there between; and
a second accumulator, coupled to the second mixer and configured to accumulate the plurality of second mixing results, respectively, to generate the plurality of in-phase signals corresponding to the plurality of frequencies, respectively.

5. The noise detection circuit of claim 1, wherein the signal cancelation operation includes performing a rotation operation to the first in-phase signal and the quadrature signal to rotate coordinate axes by an angle to generate a rotated in-phase signal and a rotated quadrature signal by the computing circuit, and calculating and outputting the first output signal of the plurality of output signals that is corresponding to the first frequency according to the rotated quadrature signal by the computing circuit.

6. The noise detection circuit of claim 5, wherein when the touch control system performs touch detection based on the first frequency, the computing circuit performs the following steps so as to perform the rotation operation to the first in-phase signal and the first quadrature signal to rotate the coordinate axes by the angle, thereby generating the rotated in-phase signal and the rotated quadrature signal:

$$\text{performing an operation of } \begin{bmatrix} I_k^R \\ Q_k^R \end{bmatrix} = \begin{bmatrix} \cos\theta_D & -\sin\theta_D \\ \sin\theta_D & \cos\theta_D \end{bmatrix} \begin{bmatrix} I_k \\ Q_k \end{bmatrix};$$

wherein, $I_K$ represents the first in-phase signal, $Q_K^R$ represents the first quadrature signal, $I_K^R$ represents the rotated in-phase signal, $Q_K^R$ represents the rotated quadrature signal, and $\theta_D$ represents the angle of rotation; and
the computing circuit obtains a touch in-phase signal, a touch quadrature signal, a non-touch in-phase signal and a non-touch quadrature signal, the touch in-phase signal and the touch quadrature signal form a first vector, the non-touch in-phase signal and the non-touch quadrature signal form a second vector, the computing circuit obtains the angle of rotation, which is a phase angle of a vector difference between the first vector and the second vector.

7. The noise detection circuit of claim 5, the computing circuit further performs the following steps to calculate the first output signal corresponding to the first frequency, according to the rotated quadrature signal: calculating a subtraction result between the rotated quadrature signal and the average value, wherein the first output signal is associated with the subtraction result.

8. The noise detection circuit of claim 1, wherein the signal cancelation operation comprises calculating an energy signal according to the first in-phase signal and the quadrature signal, and subtracting an average energy signal from the energy signal to generate the first output signal as the subtraction result between the energy signal and the average energy signal by the computing circuit.

9. The noise detection circuit of claim 1, wherein the second output signal is associated with an amplitude formed by the second in-phase signal and the second quadrature signal.

10. The noise detection circuit of claim 1, further comprising a signal processing module, configured to generate the integrated signal according to at least one of the plurality of receiving signals.

11. The noise detection circuit of claim 1, further comprising: a signal generator, coupled between the determination circuit and a transfer electrode of the touch panel; wherein, during a first time interval, the signal generator generates a first transfer signal having the first frequency to the transfer electrode, and the first time interval is a time interval that the touch control system uses the first frequency to perform touch detection; wherein, during a second time interval, the signal generator generates a second transfer signal having the best frequency to the transfer electrode.

12. The noise detection circuit of claim 1, wherein the signal cancelation operation comprises calculating an average in-phase signal and an average quadrature signal by the computing circuit, and subtracting the average in-phase signal and the average quadrature signal from the first in-phase signal and the quadrature signal respectively to obtain a subtraction result and generating the first output signal according to the subtraction result by the computing circuit, wherein the first output signal is associated with an energy or an amplitude of the subtraction result.

13. A noise detection method for use in a touch control system, comprising:
    generating a first transfer signal having a first frequency of a plurality of frequencies to a transfer electrode;
    receiving an integrated signal, wherein the integrated signal is associated with a plurality of receiving signals carried by a plurality of receiving electrodes, and the plurality of receiving signals correspond to the first transfer signal having the first frequency;
    performing a mixing operation to the integrated signal based on the plurality of frequencies to generate a plurality of in-phase signals corresponding to the plurality of frequencies and a plurality of quadrature signals corresponding to the plurality of frequencies;
    generating a plurality of output signals corresponding to the plurality of frequencies according to the plurality of in-phase signals and the plurality of quadrature signals, including:
        performing a signal cancelation operation to a first in-phase signal of the plurality of in-phase signals that is corresponding to the first frequency and a first quadrature signal of the plurality of quadrature signals that is corresponding to the first frequency, to calculate and output a first output signal of the plurality of output signals that is corresponding to the first frequency; and
    according to a second in-phase signal of the plurality of in-phase signals that is corresponding to a second frequency of the plurality of frequencies and a second quadrature signal of the plurality of quadrature signals that is corresponding to the second frequency, calculating and outputs a second output signal of the plurality of output signals that is corresponding to the second frequency without performing the signal cancelation operation, wherein the second frequency differs from the first frequency; and
    selecting a best output signal from the plurality of output signals and outputting a best frequency, wherein the best frequency corresponds to the best output signal, and the best output signal has the minimum value among the plurality of output signals.

14. The noise detection method of claim 13, wherein the step of generating a plurality of output signals corresponding to the plurality of frequencies according to the plurality of in-phase signals and a plurality of quadrature signals comprises:
    performing a rotation operation to the first in-phase signal of the plurality of in-phase signals that is corresponding to the first frequency and all the first quadrature signal of the plurality of quadrature signals that is corresponding to the first frequency to rotate coordinate axes by an angle to generate a rotated in-phase signal and a rotated quadrature signal;
    calculating and outputting all the first output signal corresponding to the first frequency according to the rotated quadrature signal.

15. The noise detection method of claim 14, wherein the step of performing the rotation operation to the first in-phase signal and the first quadrature signal to rotate coordinate axes by an angle to generate the rotated in-phase signal and the rotated quadrature signal comprises:

performing an operation of $\begin{bmatrix} I'_k \\ Q'_k \end{bmatrix} = \begin{bmatrix} \cos\theta_D & -\sin\theta_D \\ \sin\theta_D & \cos\theta_D \end{bmatrix} \begin{bmatrix} I_k \\ Q_k \end{bmatrix}$;

wherein, $I_k$ represents the first in-phase signal, $Q_k$ represents the first quadrature signal, $I_k'$ represents the rotated in-phase signal, $Q_k'$ represents the rotated quadrature signal, and $\theta_D$ represents the angle of rotation.

16. The noise detection method of claim 15, further comprising:
    obtaining a touch in-phase signal, a touch quadrature signal, a non-touch in-phase signal and a non-touch quadrature signal, wherein the touch in-phase signal and the touch quadrature signal form a first vector, and the non-touch in-phase signal and the non-touch quadrature signal form a second vector;
    obtaining a vector difference between the first vector and the second vector; and
    obtaining the angle of rotation as a phase angle of the vector difference.

17. The noise detection method of claim 14, wherein the step of calculating the first output signal corresponding to the first frequency according to the rotated quadrature signal comprises:
    calculating an average value of the rotated quadrature signal; and
    calculating a subtraction result between the rotated quadrature signal and the average value, wherein the first output signal is associated with the subtraction result; and
    wherein the step of calculating and outputting the second output signal according to the second in-phase signal and the second quadrature signal comprises:
    forming an amplitude by the second in-phase signal and the second quadrature signal, wherein the second output signal is associated with the amplitude.

18. The noise detection method of claim 14, wherein the step of generating a plurality of output signals corresponding to the plurality of frequencies according to the plurality of in-phase signals and a plurality of quadrature signals comprises:
    calculating an energy signal according to the first in-phase signal of the plurality of in-phase signals that is corresponding to the first frequency and the first quadrature signal of the plurality of quadrature signals that is corresponding to the first frequency; and
    subtracting an average energy signal from the energy signal to generate a first output signal corresponding to the first frequency as the subtraction result of the energy signal and the average energy signal.

19. The noise detection method of claim 13, wherein the step of generating a plurality of output signals corresponding to the plurality of frequencies according to the plurality of in-phase signals and a plurality of quadrature signals comprises:
    calculating an average in-phase signal and an average quadrature signal;
    subtracting the average in-phase signal and the average quadrature signal from the first in-phase signal of the plurality of in-phase signals that is corresponding to the first frequency and the first quadrature signal of the plurality of quadrature signals that is corresponding to the first frequency respectively to obtain a subtraction result; and
    generating the first output signal according to the subtraction result, wherein the first output signal is associated with an energy or an amplitude of the subtraction result.

* * * * *